United States Patent Office 3,057,952
Patented Oct. 9, 1962

3,057,952
MULTI-PLY FLEXIBLE WIRING UNIT
George F. Gordon, Nashua, N.H., assignor to Sanders Associates, Inc., Nashua, N.H., a corporation of Delaware
Filed Oct. 31, 1960, Ser. No. 66,057
4 Claims. (Cl. 174—117)

This invention relates to flexible wiring units for electrical mechanism of the type wherein a plurality of thin flat conductors are received between a pair of preformed sheets of dielectric thermoplastic resin and are encapsulated thereby, the sheets being strongly bonded to the flat faces of the conductors and in the areas between and around them being autogenously welded together. The invention more particularly relates to a unit wherein two assemblies as above described are superposed in at least a part of their areas and connected to provide a multi-ply unit with sets of conductors in different planes.

My invention will be well understood by reference to the following description of an illustrative embodiment thereof taken in connection with the accompanying drawings wherein.

Figure 1:
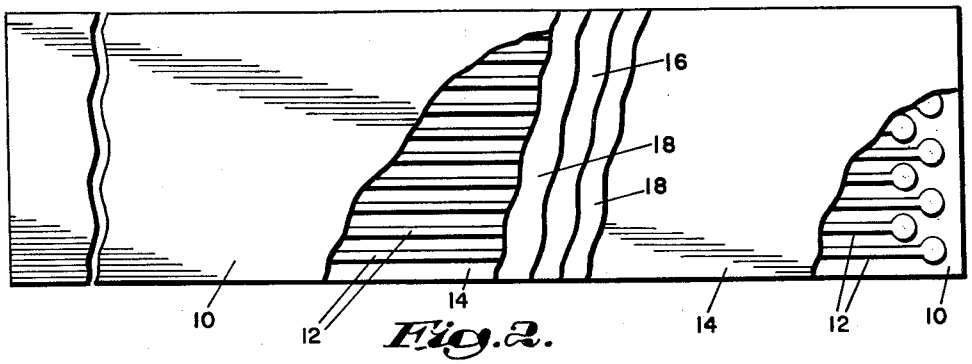
FIG. 1 is a plan view with parts successively broken away.

Referring to FIG. 1 the lower portion of this figure may be referred to separately as illustrating a sub-assembly (which in itself may be considered as an embodiment of the prior art) and comprises a preformed sheet of thermoplastic resin 10 to the upper face of which is strongly bonded a plurality of strips 12 of copper foil providing conductors. A second sheet of similar resin 14 covers them, is bonded to their upper surfaces and, except where the conductors intervene, the apposed faces of the sheets 12 and 14 are joined together by an autogenous weld. Localized parts of one or both of the sheets may be omitted or cut away after joining to provide access to the conductors for making connections thereto in accordance with known practices of the art.

Preferably a sheet of copper foil is treated to provide a coat of black copper oxide crystals and the foil is bonded by heat and pressure to sheet 10. A suitable resist is applied over the areas which are to form the conductors. The unprotected parts of the foil are then etched away. The sheet 14 is then superposed and the parts joined by heat and pressure.

While flexible wiring units may be formed by using various kinds of resins, for more exacting requirements the use of fluorocarbon resins is desirable. Polytetrafluoroethylene notably has highly desirable electrical properties. It is not affected by nor will it absorb water, it resists chemical and mechanical attack. On the other hand it might be said to have the defects of its qualities. It is rather intractable. This word is not a technical one, but expresses the general idea that it is hard to handle. It is difficult to make it stick to other materials and, without special surface preparation, it is difficult to bond two sheets strongly together. Polytrifluorochloroethylene approaches polytetrafluoroethylene in its desirable qualities and is more tractable. The same may be said of the fully fluorinated copolymer of ethylene and propylene, conveniently designated as F.E.P. resin. These three are readily available commercially at the present time, the first and third from E. I. du Pont de Nemours & Co. of Wilmington, Delaware, under its trademark "Teflon" and the second from Minnesota Mining & Manufacturing Co. of St. Paul, Minnesota, under its trademark "Kel-F." Interpolymers of tetrafluoroethylene and trifluorochloroethylene have properties intermediate the two. Copolymers of tetrafluoroethylene with organic compounds containing multiple bonded carbon linkages are analagous.

Among all these we may select those having a volumetric electrical resistance of at least $10^{15}$ ohms per cubic centimeter (indicative of acceptable electrical properties) and resistant to substantial distortion at temperatures as high as 180° C.

The laminations need not be all of one resin although they well might be. Thus referring to the figures the outwardly facing sheets 10 might be trifluorochloroethylene and the inwardly facing sheets 12 F.E.P. or vice versa.

Figure 2:
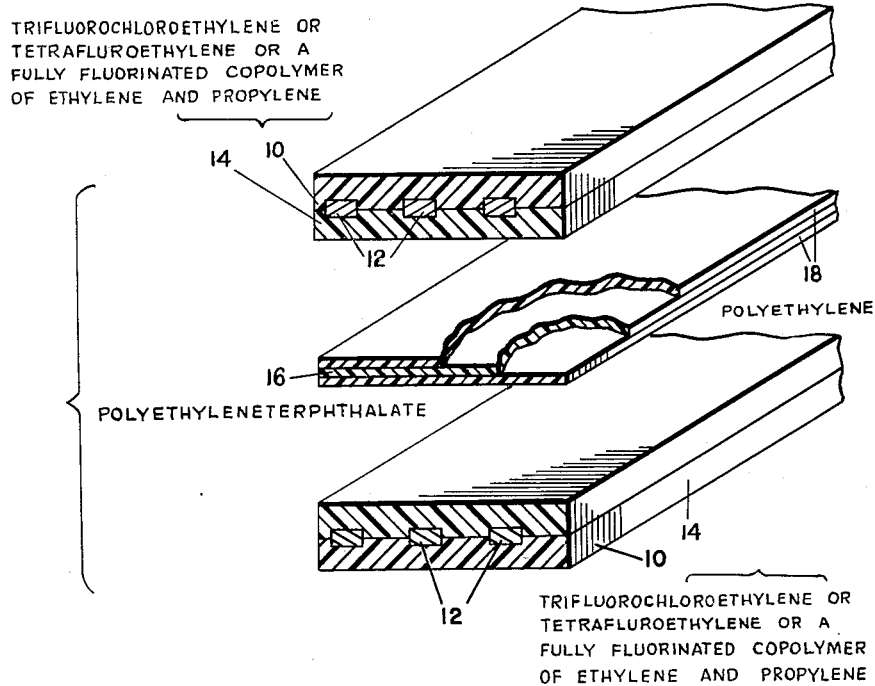
FIG. 2 is an exploded view, part transverse section and part perspective and with parts broken away.

If we were to attempt to build up a laminated structure by directly superposing two sub-assemblies as shown at the upper and lower parts of FIG. 2 respectively, and then welding the opposed faces of the sheets 14 together by heat and pressure applied to the outer faces of sheets 10, the desirable qualities of high heat resistance of the fluorocarbon resins involved would cause difficulty. We must transmit the heat through twice the thickness that was in question in forming the sub-assemblies themselves. A high temperature would be required at the interface and the heating of the parts of the assemblies outward of the interface would be such as to make undue softening likely and lead to displacement of the conductors from their relative position. A gross defect would be to cause actual contact between two adjacent conductors or else to bring them into such proximity that the resulting electrical influence of the current in one on the current in the other would be inadmissible.

In accordance with the invention I interpose between the two sub-assemblies a thin film of thermoset resinoid which may be, and preferably is, polyethyleneterephthalate, a polyester available commercially in film from E. I. du Pont de Nemours & Co. under its trademark "Mylar". A film of this material one mil thick may be used. The outstanding properties of this film for the present application are its uniform texture, high mechanical strength, dimensional and thermal stability and capability of withstanding repeated flexure. It also has excellent dielectric properties and good chemical resistance although, in view of the protection afforded it by the other laminae, these are of a lesser degree of importance. Other materials reasonably comparable to this one in the properties first recited, although perhaps not fully equal thereto, may be substituted. Available technical information or routine tests not of an inventive nature will provide reliable information as to the substantial equivalence and acceptability of other resinoids.

This film is connected to the adjacent sheets by films 18 of thermoplastic resin softening at a relatively low temperature as compared with the fluorocarbon resins in the sub-assemblies and which serve as heat seal adhesives for joining the film 16 to the adjacent faces of the sheets 14. Resins capable of softening at a temperature as low as 150° C. may be used. One such resin is polyethylene, which may be "cast" or coated on the film 16 in a separate operation to form a sub-unit as illustrated in the middle of FIG. 2. The coated film 16 is interposed between the two sub-assemblies and the whole subjected to heat and pressure, the temperature being such as only to soften the coating 18 to adhesiveness.

The spacial relationships of the components of the two sub-assemblies remain unimpaired. Their inherent electric properties are as before and are if anything improved by the presence of film 16. The multi-ply assembly is not objectionably stiffened. It is freely flexible, but is mechanically reinforced and its dimensional stability is increased.

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. A multi-ply unit for electric mechanism of the type wherein a plurality of sets of conducting elements, with the elements of each set disposed in a common plane or surface, are encapsulated in resinous dielectric material insulating the elements from one another and from the exterior except where connection points are intentionally provided for by removal or omission of portions of the resinous envelope, the unit comprising a first sub-assembly consisting of a group of correlated conductors adhered to and received between a pair of thin flexible sheets of one or more fluorocarbon resins of the class comprising tetrafluoroethylene, trifluorochloroethylene, interpolymers thereof, copolymers thereof with organic compounds containing multiple bonded carbon linkages, and fluorinated copolymers of ethylene and propylene, all of which have a volumetric resistance of at least $10^{15}$ ohms per cubic centimeter and are resistant to substantial distortion at temperatures as high as 180° C. and are of low heat conductivity, the resinous sheets being adhered to the conductors, intruding into the spaces around them and joined face to face in an autogenous weld except where spaced by said conductors, a second like sub-assembly, and between them a thin flexible sheet of like area which is a thermoset resinoid having physical properties as regards uniformity of texture, mechanical strength, dimensional and thermal stability and capability of withstanding repeated flexure substantially comparable to those of the polyethyleneterephthalate film described, said sheet being bonded to the opposed surfaces of the two sub-assemblies by films of thermoplastic dielectric resin, activatable to adhesive tackiness at a temperature as low as 150° C.

2. A unit as set forth in claim 1 wherein the resin sheets of the sub-assemblies are of polytrifluorochloroethylene.

3. A unit as set forth in claim 1 wherein the resin sheets of the sub-assemblies are of a fully fluorinated copolymer of ethylene and propylene resin.

4. A unit as set forth in claim 1 wherein the resin sheets of each one of the sub-assemblies are respectively polytrifluorochloroethylene and a fully fluorinated copolymer of ethylene and propylene resin.

No references cited.